United States Patent [19]

Berdasco et al.

[11] Patent Number: 5,045,259
[45] Date of Patent: Sep. 3, 1991

[54] EXTRUSION OF VINYLIDENE CHLORIDE COPOLYMERS UNDER INERT ATMOSPHERE

[75] Inventors: Jack A. Berdasco; Stephen R. Betso; Kun S. Hyun, all of Midland; Bobby A. Howell, Mount Pleasant; Bernard C. Obi-Ahuba, Midland, all of Mich.

[73] Assignee: The Dow Chemical Company, Midland, Mich.

[21] Appl. No.: 493,100

[22] Filed: Mar. 14, 1990

[51] Int. Cl.$^5$ .............................................. B29C 47/78
[52] U.S. Cl. ...................................... 264/85; 264/564; 264/169; 264/173; 264/211; 425/73; 425/326.1
[58] Field of Search .................. 264/85, 173, 169, 211, 264/209.7, 564; 425/75, 326.1, 73

[56] References Cited

U.S. PATENT DOCUMENTS

| | | | |
|---|---|---|---|
| 2,409,521 | 10/1946 | Wiley | 264/85 |
| 2,975,472 | 3/1961 | Colombo | 425/532 |
| 3,044,114 | 7/1962 | Pirot | 425/326.1 |
| 3,309,441 | 3/1967 | Burczyk et al. | 264/85 |
| 3,477,099 | 11/1969 | Lee et al. | 425/133.5 |
| 4,079,115 | 3/1978 | Settineri et al. | 264/331.15 |
| 4,153,659 | 5/1979 | Recktenwald et al. | 264/85 |
| 4,203,938 | 5/1980 | Burnett et al. | 264/331.14 |
| 4,804,510 | 2/1989 | Luecke et al. | 264/169 |
| 4,842,791 | 6/1989 | Gould et al. | 425/131.1 |

FOREIGN PATENT DOCUMENTS 49-27429  7/1974  Japan ................................... 264/85

Primary Examiner—Jeffery Thurlow

[57] ABSTRACT

The present invention is a process for forming an extruded article containing a copolymer of vinylidene chloride and at least one other ethylenically-unsaturated comonomer, said process comprising the step of extruding the copolymer in the presence of (1) at least one gas which is inert with respect to the copolymer and does not plasticize the copolymer; and (2) essentially no gases which are not inert with respect to the copolymer. Vinylidene chloride copolymers extruded according to the process of the present invention have lower metal adhesion and less tendency to contain specks of carbon than do vinylidene chloride copolymer copolymers extruded under an air atmosphere.

20 Claims, No Drawings

EXTRUSION OF VINYLIDENE CHLORIDE COPOLYMERS UNDER INERT ATMOSPHERE

BACKGROUND OF THE INVENTION

The present invention relates to the art of poly(vinylidene chloride) copolymer fabrication.

Copolymers of vinylidene chloride and various ethylenically-unsaturated comonomers are known to be useful as barrier polymers. The copolymer is typically fed into the extruder as a powder or pellet and extruded as a monolayer film or coextruded in discrete layers with at least one other polymer as a multilayer film of thermoformable sheet. Vinylidene chloride copolymers, their uses and their fabrication are described in numerous references, such as R. A. Wessling, *Polyvinylidene Chloride* (Gordon & Breach Sci. Pub. 1977): 23 Kirk-Othmer Ency. Chem. Tech., *Vinylidene Chloride and Poly(Vinylidene Chloride)*, 764 (J. Wiley & Sons 1983): and Ma et al., *Plastic Films*, Report No. 159 of SRI International Process Economics Program 179-210 (February 1986), which are incorporated herein by reference. The resulting products provide excellent barrier with respect to transportation of oxygen, water, carbon dioxide and flavoring for food, medical and other high barrier packaging.

Vinylidene chloride copolymers are susceptible to thermal degradation during extrusion. Exposure to heat causes the polymer to carbonize, releasing hydrogen chloride. Carbonization is not a problem for most vinylidene chloride copolymers which pass through an extruder because the residence time of the copolymer is too short for substantial carbonization to occur. However, vinylidene chloride copolymers can adhere to the metal of an extruder. Adhering polymer does not forward at an adequate rate and carbonizes. The carbonized material can flake off of the metal during the extrusion, causing specks of carbonaceous material to appear in the extruded product. The level of carbonaceous material ordinarily increases at higher extrusion rates, which produce higher temperatures in the polymer. Carbonaceous material is unsightly and may cause the customer of the extruded product to reject the product.

A variety of additives have been added to vinylidene chloride copolymers to help control thermal degradation and permit extrusion at higher rates. See, e.g., R. A. Wessling, *Polyvinylidene Chloride* at 174–76, and Johnson, *Process for Imparting Stability to Particulate Vinylidene Chloride Polymer Resins*. U.S. Pat. No. 4,418,168 (Nov. 29, 1983), which are incorporated herein by reference. For instance, some commercially available vinylidene chloride copolymer resins contain stabilizing amounts of tetrasodium pyrophosphate and epoxidized soybean oil.

However, additives affect the barrier properties of the resin and must be qualified by governmental regulatory agencies before they are used in products which come in contact with food. What is needed is a process for extruding a vinylidene chloride copolymer that can minimize the carbonization of a vinylidene chloride copolymer without relying upon further additives.

Summary of the Invention

The present invention is a process for forming an extruded article containing a copolymer of vinylidene chloride and at least one other ethylenically-unsaturated comonomer, said process comprising the step of extruding the copolymer in the presence of (1) at least one gas which is inert with respect to the copolymer and does not plasticize the copolymer: and (2) essentially no gases which are not inert with respect to the copolymer. For the purposes of this application, the term "extruding . . . in the presence of" a gas shall refer to gases which find their way into the extruder barrel, and not necessarily to the atmosphere that the extruded polymer enters as it leaves the extrusion die.

The process of the present invention causes much lower carbonization than do ordinary air atmosphere extrusions using the same copolymer (with or without stabilizers). Therefore, the use of particular additives to prevent carbonization may be minimized.

DETAILED DESCRIPTION OF THE INVENTION

Vinylidene chloride copolymers suitable for use in the present invention contain a major portion of vinylidene chloride and a minor portion of an ethylenically-unsaturated comonomer that is suitable for forming a semicrystalline barrier polymer. Many suitable ethylenically-unsaturated comonomers are known, such as vinyl chloride, alkyl acrylates, alkyl methacrylates, acrylic acid, methacrylic acid, itaconic acid and aryl acrylates and methacrylates. The important factor is that the ethylenically-unsaturated comonomer must be chosen and used in proportions such that the resulting copolymer is extrudable and retains a semi-crystalline character. By "semicrystalline character" it is meant that the copolymer has between about 5 percent and about 95 percent crystallinity. Crystallinity values depend upon the measuring technique, and as used herein crystallinity is defined by the commonly used density method. See, for example, the discussion by R. A. Wessling, in Chapter 6 of *Polyvinylidene Chloride*. Vol. 5, Gordon and Breach Science Publishers, New York, 1977, the teachings of which are incorporated herein by reference.

The ethylenically-unsaturated comonomer is preferably vinyl chloride or an alkyl acrylate. The alkyl acrylates are generally selected to have from about 1 to about 8 carbon atoms per alkyl group. Preferably, alkyl acrylates are selected to have from about 1 to about 4 carbon atoms per alkyl group. The alkyl acrylate is more preferably ethyl or methyl acrylate and most preferably methyl acrylate.

When the ethylenically-unsaturated comonomer is vinyl chloride, then it preferably makes up at least about 10 percent and more preferably at least about 12 percent of the copolymer: it is preferably at most about 20 percent and more preferably at most about 17 percent of the copolymer. When the ethylenically-unsaturated comonomer is methyl acrylate, then it preferably makes up at least about 4 percent and most preferably at least about 5 percent of the resulting copolymer: it is preferably at most about 9 percent and more preferably at most about 7 percent of the resulting copolymer. The vinylidene chloride copolymer is most preferably a 6 percent methyl acrylate copolymer. The remainder of the copolymer in each case preferably consists essentially of vinylidene chloride. Of course, the vinylidene chloride copolymer may also contain small amounts (usually less than about 1 to 2 percent) of other ethylenically-unsaturated comonomers which do not substantially reduce the extrudability or increase the permeability of the copolymer.

Vinylidene chloride copolymers are known and are commercially available. Methods to synthesize them, such as by an emulsion or suspension polymerization process, are also familiar to persons of ordinary skill in the art. The copolymers and processes to synthesize them are described in U.S. Pat. Nos. 2,558,728; 3,007,903; 3,642,743: and 3,879,359: in R. A. Wessling, *Polyvinylidene Chloride supra.* at 21–33 and 44–53; in 23 Kirk-Othmer Ency. Chem. Tech., supra, at 783–87: and in Yen et al., *Barrier Resins.* Report No. 179 of SRI International Process Economics Program 55-106 (February, 1986); all of which are incorporated herein by reference. Typically, the monomers are emulsified or suspended in an aqueous phase. The aqueous phase in an emulsion polymerization contains a polymerization initiator and a surface active agent capable of emulsifying or suspending the monomers in the aqueous phase. The polymerization of the monomers is usually carried out with heating and agitation. After polymerization is complete, the resulting suspension or emulsion slurry of vinylidene chloride copolymer has a majority of an aqueous phase. The resultant slurry is vacuum stripped. Thereafter, the slurry is cooled down, unloaded and dewatered, and the resin is collected and further dried.

The vinylidene chloride copolymer may also contain additives to improve extrudability, stabilize the polymer or perform other functions. Many such additives are known. See, e.g., R. A. Wessling, *Polyvinylidene Chloride* at 174–76, and Johnson, *Process for Imparting Stability to Particulate Vinylidene Chloride Polymer Resins.* U.S. Pat. No. 4,418,168 (Nov. 29, 1983), which are incorporated herein by reference. Useful additives may include inorganic stabilizers, such as tetrasodium pyrophosphate (TSPP), magnesium hydroxide (Mg(OH)$_2$), magnesium oxide, calcium hydroxide, and potassium pyrophosphate or an equivalent thereof; high density polyethylene: epoxidized vegetable oils, such as epoxidized soybean oil and epoxidized linseed oil; oxidized polyolefins: and/or paraffin or polyethylene wax.

Such additives are known and/or available from the following sources:

(a) *inorganic stabilizers* and their synthesis are described in Johnson, *Process for Imparting Stability to Particulate Vinylidene Chloride Polymer Resins*, U.S. Pat. No. 4,418,168 (Nov. 29, 1983) and *The Merck Index*, 10th Edition, (1983), which are incorporated herein by reference. The most preferred stabilizer is tetrasodium pyrophosphate. Its concentration is preferably no more than 1.1 part per 100 parts of copolymer, by weight. It preferably has an average particle size of 1 to 50 microns;

(b) *high density polyethylene*, its properties and its synthesis are described in 16 Kirk-Othmer Ency. Chem. Tech. - 3rd Ed., *Linear (High Density) Polyethylene* and *Olefin Polymers (Ziegler Polyethylene)* at 421–51 (J. Wiley & Sons 1980), which is incorporated herein by reference. Its concentration is preferably no more than 1.1 part per 100 parts of copolymer, by weight.

(c) *epoxidized vegetable oils* are known and are commercially available compounds. They and processes to synthesize them are described in 9 Kirk-Othmer Ency. Chem. Tech. - 3rd Ed., *Epoxidation.* at 251–63 (J. Wiley & Sons 1980), which is incorporated herein by reference. Its concentration is preferably no more than 1 part per 100 parts of copolymer, by weight.

(d) *Oxidized polyolefins* preferably have an acid number of about 10 to 35, a softening point of about 85° C. to 145° C. as determined by ASTM E-28, a number average molecular weight of about 1000 to about 5000 as determined by vapor phase osmometry, and a Brookfield viscosity at 140° C. of about 120 to 300 centipoise (cps). Oxidized polyethylene and oxidized polypropylene are known polymers which are commercially available, for instance under the trademark Allied 629A from Allied-Signal Corp. They can be prepared by treating an ethylene homopolymer or copolymer with oxygen or an organic peroxide or hydroperoxide. The processes for synthesizing them are described in 16 Kirk-Othmer Ency. Chem. Tech.-3rd Ed. *Olefin Polymers (High Pressure Polyethylene).* at 412 (J. Wiley & Sons 1980) and 24 Kirkr-Othmer Ency. Chem. Tech. - 3rd Ed. *Waxes,* at 477 (J. Wiley & Sons 1980), which are incorporated herein by reference.

(e) Paraffin waxes are defined herein as having a Brookfield viscosity in the range of about 50 to about 300 cps @ 140° C: a melting point in the range of about 40° C. to about 80° C: and a density in the range of about 0.85 g/cm3 to about 0.95 g/cm3. *Polyethylene waxes* are defined herein as having Brookfield viscosity in the range of about 130 to about 450 cps @ 140° C; a melting point in the range of about 80° C. to about 100° C: and a density in the range of about 0.85 g/cm3 to about 0.95 g/cm3. Paraffin and polyethylene waxes and their properties and synthesis are described in 24 Kirk-Othmer Ency. Chem. Tech. - 3rd Ed., *Waxes,* at 473–77(J. Wiley & Sons 1980), which is incorporated herein by reference. The wax is preferably polyethylene wax.

The vinylidene chloride copolymer may contain additional additives well-known to those skilled in the art. Exemplary of additives which may be incorporated in the formulation are light stabilizers and antioxidants such as hindered phenol derivatives, pigments such as titanium dioxide and the like. Each of these additives is known and several types of each are commercially available.

The additives are blended with the vinylidene chloride copolymer by any method which is effective to achieve substantially homogeneous dispersion of the additives without unduly heating the resin. Blending can be accomplished by conventional dry blending techniques. It preferably uses high intensity blending. Suitable dry blending equipment includes Hobart mixers, Welex mixers, Henschel High Intensity mixers, and the like.

The vinylidene chloride copolymer may also contain a nucleating agent, as is described in DeLassus et al., *Method For the Preparation of a Vinylidene Chloride Interpolymer Film.* U.S. Pat. No. 4,694,068 (Sept. 15, 1987), which is incorporated herein by reference.

The vinylidene chloride copolymer may be in the form of a powder or a pellet.

In processes of the present invention, the vinylidene chloride copolymer is extruded. The term "extrude," as used in this application refers to both monolayer extrusion, in which the extrusion product consists essentially of a single layer of the copolymer, and coextrusion, in which the extrusion product contains a plurality of discrete layers, at least one of which contains the vinylidene chloride copolymer whereas others contain other polymers such as polypropylene, polyethylene, polystyrene or other polymers.

Such extrusion typically is carried out using a single or multiple screw extruder, most often a single screw extruder specially constructed for use with thermally sensitive copolymers such as vinylidene chloride copolymer. Such extrusion is familiar to persons of ordinary skill in the art. It is described in a number of patents and other general references, such as U.S. Pat. Nos. 4,863,784 4,355,905; 4,647,509; 4,694,068 and R. A. Wessling, *Polyvinylidene Chloride, supra,* at 176-80; in 23 Kirk-Othmer Ency. Poly Sci, *supra.* at 788-90; and in Ma et al., *Plastic Films,* Report No. 159 of SRI International Process Economics Program 179-210 (February 1986): all of which are incorporated herein by reference.

The extrusion is carried out (1) in the presence of a gas which is inert with respect to the vinylidene chloride copolymer under extrusion conditions and which does not substantially plasticize the vinylidene chloride copolymer: and (2) in the presence of essentially no gas that is not inert with respect to the vinylidene chloride copolymer. The term "inert" means, for the purposes of this application, that the gas does not react with the copolymer in any chemical fashion under extrusion conditions. The inert gas is preferably nitrogen or a noble gas, such as helium or argon. The inert gas is more preferably nitrogen. A mixture of inert gases may be used, but preferably only a single inert gas is used. Substantial plasticization is plasticization which adversely affects the barrier properties and/or crystallization of the extruded resin in a substantial way.

Air is ordinarily carried from the feed hopper of the extruder into the extruder barrel along with the vinylidene chloride copolymer. Surprisingly, oxygen in the air contributes to carbonization of the vinylidene chloride in the extruder. It has been observed that vinylidene chloride copolymers which are melt processed in air have a substantially higher metal adhesion than the same copolymers which are melt processed under inert atmosphere under otherwise similar conditions.

It is theorized, without intending to be bound thereby, that oxygen and similar reactive gases contribute to chain scission and cross-linking reactions in the polymer, that the chain scission and crosslinking products increase the metal adhesion of the polymer, and that the increased metal adhesion causes the polymer to stick and carbonize in the extruder. Reactions causing degradation of the polymer may occur in the presence of oxygen at temperatures of about 150° C., below the melting point of the polymer. It is further theorized, without intending to be bound thereby, that the present invention, by carrying out the extrusion in the presence of an inert gases only, minimizes the formation of degradation products, thereby minimizing metal-adhesion and the resulting carbonization of the copolymer.

All but inert gases must be excluded from the extruder at any point within the extruder where the vinylidene chloride copolymer is heated to a temperature at which degradation can occur in the presence of air. All but inert gases are preferably excluded at any point in the process where the vinylidene chloride copolymer is sufficiently heat-plasticized to be forwardable within the extruder and/or extrudable. Such temperatures are ordinarily at least about 125° C. and at most about 200° C., and more often at least about 135° C. and at most about 175° C., and most often at least about 150° C. The polymer is conveniently under an inert gas atmosphere during the entire time that it is in the barrel of the extruder. It is most convenient to flood the feed hopper of the extruder with inert gas at a rate sufficient to exclude atmospheric oxygen. The pressure of the inert gas may be subambient if sufficient precautions are taken to exclude oxygen, but it is preferably at least about ambient pressure and more preferably slightly above ambient pressure.

Ordinarily, the vinylidene chloride copolymer need not be kept under inert atmosphere after it leaves the extrusion die. However, in special circumstances it may be desirable to keep the extruded product in contact with only inert gases until it cools; for instance, when the extruded product is a pellet which is intended to be reextruded into another shaped article at a later time.

Aside from the presence of an inert gas and the absence of any non-inert gas, the extrusion is carried out according to conventional extrusion procedures and under ordinary conditions. Those procedures and conditions vary depending upon the equipment in use and the intended product specifications. In using conventional processing equipment for thermally sensitive polymers, three process conditions are balanced: residence time, process temperature and mixing. The energy input into the vinylidene chloride copolymer must be high enough to provide a visually homogeneous blend, i.e., no visible solids, within a reasonable mixing time. The temperature and residence time must also be high enough and long enough to provide a melt processable polymer, but low enough and short enough that polymer does not undergo substantial thermal degradation. As a rule, higher mechanical energy input and copolymer temperatures require shorter residence times. The most appropriate mechanical energy input, residence time and temperature conditions vary with different equipment. Persons of ordinary skill in the art can ascertain the optimum conditions for their own equipment without undue experimentation.

Articles formed by the extrusion process of the present invention may include blown and cast films, mono and multi-layer films: rigid and flexible containers;chloride copolymer rigid and foam sheet: tubes: pipes: rods; fibers; and various profiles. Lamination techniques are particularly suited to produce multi-ply sheets. As is known in the art, specific laminating techniques include fusion; i.e., whereby self-sustaining lamina are bonded together by applications of heat and pressure: wet combining, i.e., whereby two or more plies are laminated using a tie coat adhesive, which is applied wet, the liquid driven off, and combining by subsequent pressure laminating in one continuous process; or by heat reactivation, i.e., combining a precoated film with another film by heating, and reactivating the precoat adhesive so that it becomes receptive to bonding after subsequent pressure laminating.

The extruded vinylidene chloride copolymer made by the present process contains fewer carbon specks than extruded polymers from the conventional process, and the process of the present invention can be practiced for a longer period of time before it is necessary to stop and clean off accumulated carbon.

ILLUSTRATIVE EXAMPLES

The present invention is illustrated in further detail by the following examples. The examples are for the purposes of illustration only, and are not to be construed as limiting the scope of the present invention. All parts and percentages are by weight unless otherwise specifically noted.

A ¾ inch, 25-1 length-to-diameter Brabender extruder is modified so that the hopper can be flooded with nitrogen and resin can be added under nitrogen atmosphere. The hopper and barrel are purged with nitrogen for one hour, and the barrel temperature is set at 160° C. for the feed zone, 165° C. for the melting zone and 170° C. for the metering zone. The die temperature is set at 175° C. Extrudate flow rates are set at approximately 50–54 grams of copolymer per minute. A 94 percent vinylidene chloride-6 percent methyl acrylate copolymer is extruded as a tape. A brief carbon shower (appearance of carbon specks in the tape) is observed after about 122 minutes. No other carbon is observed. After 135 minutes the vinylidene chloride copolymer feed is stopped and the extruder is purged with polyethylene. Carbon appearing at the change over from the vinylidene chloride copolymer to the polyethylene is collected.

The procedure is repeated except that the system is purged for 14 hours with nitrogen. The extrusion proceeds for 180 minutes without a carbon shower.

The procedure is repeated twice without the nitrogen atmosphere under an air atmosphere. In the first run a small carbon shower is observed at about 9½ minutes, large carbon showers are observed at about 95 and 100 minutes, and continuous carbon showers are observed after about 110 minutes. In the second run, a large carbon shower is observed at about 116 minutes and continuous carbon shower is observed after 135 minutes. Carbon observed at the change over from the vinylidene chloride copolymer to polyethylene is, in each case, about 4 to 5 times that observed in similar samples obtained under nitrogen atmosphere.

(It should be noted that the feed rate, temperature and other conditions in these examples were chosen to encourage carbon formation in a reasonable time for testing purposes. Optimal conditions for a commercial extrusion will vary).

What is claimed is:

1. A process for forming an extruded article containing a semicrystalline copolymer of vinylidene chloride and at least one other ethylenically-unsaturated comonomer, said process comprising the step of extruding the vinylidene chloride copolymer in the presence of (1) at least one gas which is inert with respect to the copolymer and does not plasticize the copolymer; and (2) essentially no gases which are not inert with respect to the vinylidene chloride copolymer under conditions such that a shaped article is formed.

2. The process of claim 1 wherein the vinylidene chloride copolymer is a copolymer containing a major portion of vinylidene chloride and a minor portion of an ethylenically-unsaturated comonomer chosen from the group consisting of vinyl chloride, alkyl acrylates, alkyl methacrylates, acrylic acid, methacrylic acid, itaconic acid and aryl acrylates and methacrylates, wherein the proportion ethylenically-unsaturated comonomer in the vinylidene chloride copolymer is chosen such that the vinylidene chloride copolymer is extrudable and semicrystalline.

3. The process of claim 2 wherein the ethylenically-unsaturated comonomer is vinyl chloride.

4. The process of claim 3 wherein the gas which is inert with respect to the copolymer and does not plasticize the copolymer is chosen from the group consisting of nitrogen and noble gases.

5. The process of claim 4 wherein the gas which is inert with respect to the copolymer and does not plasticize the copolymer is nitrogen.

6. The process of claim 4 wherein the vinylidene chloride copolymer contains at least one additive chosen from the group consisting of inorganic stabilizers; high density polyethylene; epoxidized vegetable oils: oxidized polyolefins; and paraffin or polyethylene wax.

7. The process of claim 4 wherein the vinylidene chloride copolymer contains a nucleating agent.

8. The process of claim 4 wherein the vinylidene chloride copolymer contains, not counting additives, about 83 to about 88 weight percent vinylidene chloride and about 12 to about 17 weight percent vinyl chloride.

9. The process of claim 2 wherein the ethylenically-unsaturated comonomer is an alkyl acrylate wherein the alkyl group contains no more than about 8 carbon atoms.

10. The process of claim 9 wherein the ethylenically-unsaturated comonomer is an alkyl acrylate wherein the alkyl group contains no more than about 4 carbon atoms.

11. The process of claim 10 wherein the gas which is inert with respect to the copolymer and does not plasticize the copolymer is chosen from the group consisting of nitrogen and noble gases.

12. The process of claim 11 wherein the ethylenically-unsaturated comonomer is methyl acrylate.

13. The process of claim 12 wherein the gas which is inert with respect to the copolymer and does not plasticize the copolymer is nitrogen.

14. The process of claim 12 wherein the vinylidene chloride copolymer contains at least one additive chosen from the group consisting of inorganic stabilizers; high density polyethylene: epoxidized vegetable oils; oxidized polyolefins: and paraffin or polyethylene wax.

15. The process of claim 12 wherein the vinylidene chloride copolymer contains a nucleating agent.

16. The process of claim 12 wherein the vinylidene chloride copolymer contains, not counting additives, about 96 to about 92 weight percent vinylidene chloride and about 4 to about 8 weight percent methyl acrylate.

17. The process of claim 2 wherein the gas which is inert with respect to the copolymer and does not plasticize the copolymer is chosen from the group consisting of nitrogen and noble gases.

18. The process of claim 17 wherein the gas which is inert with respect to the copolymer and does not plasticize the copolymer is nitrogen.

19. The process of claim 17 wherein the vinylidene chloride copolymer contains a nucleating agent.

20. The process of claim 17 wherein the vinylidene chloride copolymer is coextruded with at least one other polymer to form an extrusion product which contains a plurality of discrete layers.

* * * * *

UNITED STATES PATENT AND TRADEMARK OFFICE
CERTIFICATE OF CORRECTION

PATENT NO. : 5,045,259

DATED : September 3, 1991

INVENTOR(S) : Jack A. Berdasco; Stephen R. Betso; Kun S. Hyun, all of Midland; Bobby A. Howell, Mount Pleasant; Bernard C. Obi-Ahuba, Midland, all of Mich.

It is certified that error appears in the above-identified patent and that said Letters Patent is hereby corrected as shown below:

Column 8, line 12, the punctuation after the word "oils:" is incorrect and should read --oils;--.

Column 8, line 40, the punctuation after the word "polyethylene:" is incorrect and should read --polyethylene;--.

Column 8, line 41, the punctuation after the word "polyolefins:" is incorrect and should read --polyolefins;--.

Signed and Sealed this

Second Day of February, 1993

*Attest:*

STEPHEN G. KUNIN

*Attesting Officer*      *Acting Commissioner of Patents and Trademarks*